May 19, 1964 J. F. WALTON 3,134,046

AMPLIFIER AND COUPLING CIRCUIT

Filed June 15, 1962

INVENTOR
JOHN F. WALTON

BY Hurvitz & Rose

ATTORNEYS

United States Patent Office 3,134,046

Patented May 19, 1964

3,134,046

AMPLIFIER AND COUPLING CIRCUIT

John F. Walton, McLean, Va., assignor, by mesne assignments, to Halliburton Company, a corporation of Delaware Filed June 15, 1962, Ser. No. 202,799
10 Claims. (Cl. 315—30)

Figure 1:
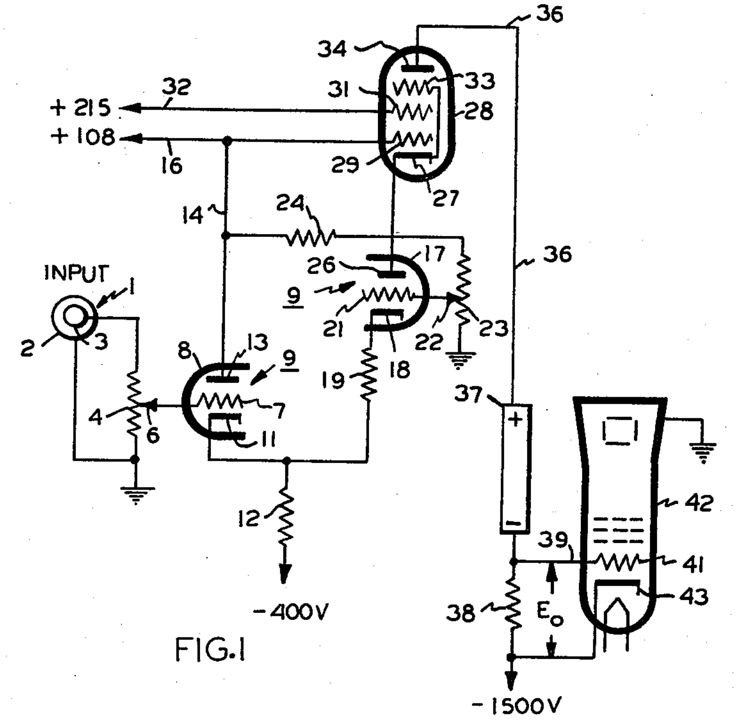

The present invention relates to electronic coupling circuits and more particularly to circuits for directly coupling a control signal into a circuit operating at a highly negative potential relative to the quiescent level of the control signal.

Although the circuits of the present invention may be utilized in any system in which the D.C. level of a control signal is significantly greater than the voltage level at which the circuit to be controlled is operated, the system is described as applied to cathode ray tube circuits. In cathode ray tube circuits, it is quite common to connect the anode or the secondary anode to a grounded chassis, or to a potential substantially the same as ground potential, and to maintain the cathode at a substantially negative voltage relative thereto by means of a negative supply connected to the cathode. In order to provide a proper grid bias, it is necessary to maintain a large negative potential on the control grid of the tube and difficulty arises in coupling intensity control signals to the control grid since the control signals normally vary about ground potential as a quiescent level.

There have been several approaches to overcoming this difficulty in the prior art and two of the more common approaches are the utilization of transformer coupling and coupling through electromagnetic radiations; that is, coupling by transmitting a signal from a transmitter to a receiver, both included in the cathode ray tube control circuitry. The difficulty with the first-mentioned approach is that high voltage insulation must be employed in the transformer thereby rendering it quite expensive. In addition, the use of high voltage insulation introduces high capacity into the transformer circuit and materially affects the transmission band width of the system. Also, the system cannot transmit D.C. signals. The latter technique relating to electromagnetic coupling is also expensive and must be relatively complex to achieve the band width required of these circuits particularly where they are employed as test instruments.

In accordance with the present invention, there is provided a system for directly coupling control signals to highly negative control grids of cathode ray tubes which system is relatively simple and economical and which has a very wide band of transmission. The information signals are applied to an amplifier having an output stage employing a low capacity high-voltage power supply. The power supply is connected between the anode of the amplifying element of the last stage of the amplifier and the load resistor of this stage which is connected to the negative voltage supply together with the cathode of the cathode ray tube. The low capacity power supply is employed as a voltage step-down element in addition to its function as an anode supply for the last stage of the amplifier. The junction of the low capacity supply and the aforesaid anode resistor may be connected directly to the control grid of the cathode ray tube so that direct coupling between the amplifier and the cathode ray tube is effected, thereby providing a circuit having a wide linear band of response. The low capacity power supply employed may be of the type disclosed in U.S. Patent No. 2,914,719 issued on November 24, 1959, to Walton et al. and assigned to the same assignee as the present invention. Due to the low shunt capacity of the aforesaid power supply to ground which is of the order of 15–20 micro-microfarads, the frequency response of the circuit is linear over a frequency range from D.C. to about 10 megacycles per second.

In a specific circuit to be described, the signal amplifier constitutes a differential amplifier having an input stage and an output stage. The output stage employs a high impedance cathode negative resistor for purposes of linearizing the response of the circuit and of stabilizing its D.C. characteristics so as to maintain a constant grid bias on the cathode ray tube. In addition, the output stage of the differential amplifier comprises a cascode amplifier employing a high voltage triode or pentode as the output tube of the output stage. The high voltage tube is employed to further add to the constant current characteristics of the output stage so that the grid bias on the cathode ray tube is relatively independent of variations in the supply voltages employed. The high voltage tube further serves a safety function in that, if for any reason the negative voltage supply for the cathode ray tube fails and short circuits, the high voltage tube prevents an excessive voltage drop being developed across the output tube of the differential amplifier which would otherwise destroy the tube.

With regard to the former function of the high voltage tube, its characteristics are that of a constant current tube which in conjunction with the cathode resistor of the output tube of the differential amplifier renders the entire system extremely insensitive to variations in supply voltage. For instance, it has been found that, with the cathode of the cathode ray tube returned to a minus 1500 volt supply, this voltage may drop to as low as 1000 volts without materially affecting the bias voltage on the grid of the cathode ray tube relative to the cathode, indicating thereby that the no-signal current drawn through the output stage of the differential amplifier is substantially independent of the voltage developed thereacross. Similar variations in the anode supply of the output stage have also produced little effect upon the bias on the grid of the cathode ray tube relative to the cathode thereof.

Thus, there is provided a circuit which permits signals to be directly coupled to a circuit operating at very large negative potentials relative to the quiescent voltage of the signal voltage, which circuit has a broad frequency band of response and which is quite insensitive to supply voltage variations.

The present invention is described as applied to a cathode ray tube circuit since the difficulties involved in coupling control signals of cathode ray tubes is well recognized in the art. It is wished to stress, however, that the concepts of the present invention are applicable to numerous other types of circuits in which the static voltage levels between two segments of a system differ widely, such as in negative voltage regulators.

It is an object of the present invention to provide a direct coupling circuit operable over a wide frequency band and between circuits having greatly different quiescent voltage levels.

It is another object of the present invention to provide a circiut for directly coupling signals from an amplifier to an electrical system operating at a potential at least several orders of magnitude negative with respect to the amplifier circuit.

Yet another object of the present invention is to provide a direct coupling between an amplifier or a control grid of a cathode ray tube which control grid is at least several orders of magnitude negative with respect to the control grid of the amplifier.

Still another object of the present invention is to provide a circuit for directly coupling signals between two electronic amplifiers in which the control electrode of the second amplifier is maintained at least several orders of magnitude negative relative to the control electrode of the first stage, which coupling circuit has a wide band pass characteristic.

It is yet another object of the present invention to provide a circuit for coupling signals which vary about ground or near ground potential to a circuit operating at very large negative potentials without requiring transformer or electomagnetic coupling between the various circuits involved.

It is another object of the present invention to provide a circuit for directly coupling signal voltages which vary about ground or near ground potential to circuits operating at very large negative potentials.

It is still another object of the present invention to provide a circuit for amplifying and coupling signals which vary about ground or near ground potentials to a circuit operating at very large negative potentials relative to ground which coupling circuit is linear over a very large range of frequencies and whose charactesistics are relatively independent of supply voltage variations over large percentages of the selected supply voltages.

Figure 2:
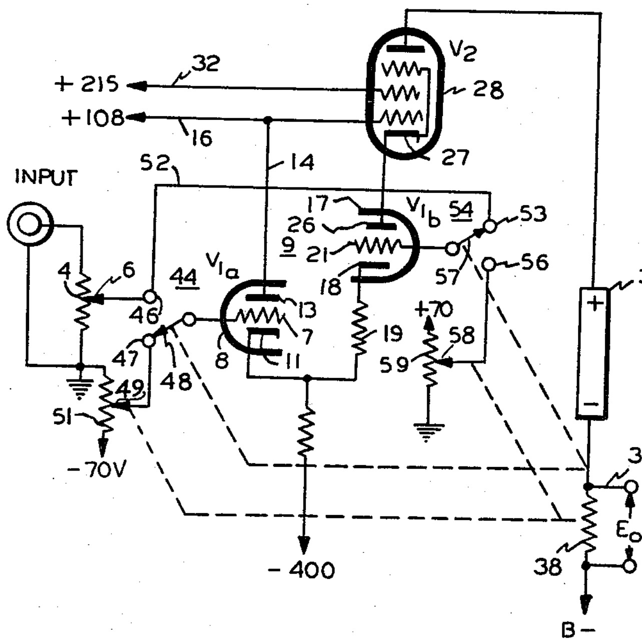

The above and still further objects, features and advantages of the present invention will become apparent upon consideration of the following detailed description of several embodiments thereof, especially when taken in conjunction with the accompanying drawings, wherein:

FIGURE 1 is a schematic electrical diagram of a basic circuit of the present invention adapted to amplify signal voltages which are positive relative to ground potentials; and FIGURE 2 is a schematic electrical diagram of a circuit which selectively operates upon voltages which vary either positively or negatively relative to ground potential.

Referring specifically to FIGURE 1 of the accompanying drawings, there is provided an input terminal or jack designated by the reference numeral 1 having a grounded outer terminal 2 and an inner terminal 3 connected through a resistor 4 to ground potential. A slider 6 is adapted to move along the resistance 4 and is directly connected to a grid 7 of a first section 8 of a dual triode generally designated by the reference numeral 9. The first section 8 of the dual triode 9 further comprises a cathode 11 connected through a resistor 12 to a negative source of potential. The section 8 also includes an anode 13 connected via a lead 14 to a positive voltage bus 16. The dual triode 9 includes a second stage 17 having a cathode 18 connected through a relatively large resistor 19 to the cathode 11 of section 8 of the dual triode 9. The section 17 of the dual triode 9 also includes a control grid 21 connected to a slider 22 adapted to move over a resistor 23 having its lower end as viewed in FIGURE 1 connected to ground potential. It is to be understood that where the term "ground potential" is employed herein it may refer to any fixed point of reference potential which may be at absolute ground or some specific value relative thereto.

The upper end of the resistor 23 as viewed in FIGURE 1 is connected through a further resistor 24 to the lead 14 and thus to the positive voltage bus 16. The section 17 of the tube 9 also includes an anode 26 connected directly to a cathode 27 of a pentode 28. The pentode includes a control grid 29 connected to the positive voltage bus 16 and a screen grid 31 connected to a positive voltage bus 32 which is at a higher positive voltage than the bus 16. The pentode also includes a suppressor grid 33 connected to the cathode 27 and an anode 34 connected via a lead 36 to a positive terminal of a low capacitance power supply 37.

The power supply 37 has a negative terminal connected through a resistor 38 to a source of negative potential which is large relative to the source of negative potential to which the lower end of the resistor 12, as viewed in FIGURE 1, is returned. The negative terminal of the supply 37 is also connected via a lead 39 to a control grid 41 of a cathode ray tube 42 having a cathode 43 connected to the lower end of the resistor 38, as viewed in FIGURE 1, and therefore to the source of relatively large negative potential.

The cathode ray tube is provided with the usual control and deflection electrodes and has an anode returned directly to ground so that a relatively large accelerating potential is developed between the cathode 43 and the anode.

For purposes of explanation of the operation of the circuit illustrated in FIGURE 1 certain values employed in a typical circuit will be given. It is to be understood that the invention is applicable to circuits having many different sets of parameters and the specific examples given are for purposes of explanation only. In a typical circuit, the lower end of the resistor 12 is returned to a negative voltage of minus 400 volts and the lower end of the resistor 38 is returned to a voltage of minus 1500 volts. The supply 37 provides a voltage of 2000 volts and the voltage busses 16 and 32 have voltages of 108 and 215 volts, respectively, developed thereon. Further, the values of the resistors 12, 19 and 38 are 150,000 ohms, 47,000 ohms and 68,000 ohms, respectively, while the tube 9 is a tube type 6922 and the tube 28 is a tube type 7683. The combination of resistor 4 and slider 6 serves as a contrast control for the cathode ray tube 42 while the combination of the slider 22 and resistor 23 serves as an intensity control; that is, a control of the quiescent or no-signal level of the bias on the grid 41.

In operation, a signal having excursions positive relative to ground is applied to the terminal 1 and the positive-going signals are applied to the grid 7. These signals increase conduction through the section 8 of the tube 9 and, due to the operation of the differential amplifier, comprising the two sections of the tube 9, the current through the section 17 of the tube 9 and the tube 28 is decreased. The initial voltage on the lead 39 and therefore on the grid 41 of the cathode ray tube 42, is maintained negative relative to the minus 1500 volts, since current flows from the minus 1500 volt supply upwardly through the resistor 38 and thence through the tubes 28 and 17. Upon a decrease in flow through the tubes 28 and 17 for reasons indicated above, the voltage on the lead 39 and therefore on the grid 41 of the cathode ray tube 42 is decreased (becomes more positive) and the electron beam current of the cathode ray tube increases, increasing the intensity of the display on the face of the tube. The amount of increase in electron current is a function of the positive excursion of the signal applied to the input terminal 1 and the intensity of the display on the cathode ray tube is a direct function of the signal applied to the input terminal 1 of the circuit.

The intensity of the quiescent or no-signal condition of the circuit is determined by the characteristics of the tubes 9 and 28, the value of the resistor 19, the value of the supply 37, the value of the resistor 38 and the setting of the slider 22 on the resistor 23. Thus, these various components are chosen to develop a current through the resistor 38 which provides a bias on the grid 41 of the cathode ray tube 42 establishing the desired no-signal intensity on the face of the tube. This intensity of display may be such that nothing is seen on the face of the tube in the absence of a signal or the display may be quite dull so as to provide a wide range of variations relative to the quiescent levels.

The intensity of the quiescent display is rendered relatively insensitive to variations in voltages of the various supplies by the utilization of the high impedance cathode resistor 19 and further by the utilization of a tube 28 having a constant current characteristic. A triode may be employed in place of the pentode 28 so long as it is connected to provide the necessary constant current characteristics normally obtained with a cascode amplifier circuit such as that employed in the circuit of FIGURE 1. Specifically, the resistor 19 tends to maintain the bias on the grid 21 relative to the cathode 18 at a substantially constant potential due to negative feedback. The tube 28 renders the anode-cathode circuit relatively insensitive to supplied voltage variations due to its constant current characteristic. It has been found that a variation of the 1500 negative volt supply down to as low as minus 1000 volts; that is, a one-third variation, has very little effect upon the bias between the control grid 41 and cathode 43 of the cathode ray tube 42 as a result of the utilization of the circuit illustrated in FIGURE 1. Thus, the quiescent current flowing through the output stage of the amplifier and therefore through the resistor 38 is a function of substantially only the value of the grid voltage 21 relative to ground.

It should be noted that it is not possible to provide negative feedback from the output circuit of the differential amplifier since such a feedback would of necessity be taken across the resistor 38 operating at a very large negative voltage relative to the voltages at which the amplifier circuit is operated. Therefore, the combination of the tube 28 and resistor 19 provides the only practical method of providing the necessary independence of the circuit from variations in the various voltage supplies.

It is seen from the above description in reference to the diagram of FIGURE 1 that the present invention provides a simple and effective method for coupling signals which vary with respect to ground or near-ground potentials to a circuit operating at a very large negative potential. Further, the circuit is highly stable and since it provides for direct coupling of signals to the control grid 41 of the cathode ray tube 42, the response of the circuit is linear over a wide range of frequencies. The coupling circuit includes a power supply and resistor only and the only limiting factors on the frequency response of the system are shunt capacities of the various components to ground. Techniques are known for providing the necessary reduction of stray capacity between the various leads and ground and, as indicated above, the specific power supply employed for the power supply 37 has a very low shunt capacity to ground being of the order of magnitude of 15–20 micro-microfarads. It is thus found that the circuit has a substantially linear response covering the range from D.C. to about 10 megacycles per second. Techniques may be employed for increasing the range of the linearity of response up to 40 megacycles per second, such techniques being disclosed in the co-pending application of John F. Walton et al., Serial No. 777,037, filed November 28, 1958, and now Patent No. 3,046,489 for "Wide-Band, Direct-Coupled Amplifier" and assigned to the same assignee as the present invention. Thus, all of the problems encountered in the prior art circuits discussed above for accomplishing similar results have been eliminated or at least reduced to readily manageable proportions and a simple and highly efficient circuit substituted for these other approaches.

It should be noted that the power supply 37 serves the dual function of providing the necessary anode supply for the cascode circuit comprising tubes 28 and section 17 of the tube 9 and also serves to provide the necessary voltage step-down between the anode 34 of the tube 28 and the control grid 41 of the cathode ray tube 42. Specifically, the supply 37 maintains the lead 36 attached to the anode 34 of the tube 28 at roughly plus 500 volts with respect to ground while the cathode 18 of the section 17 of the tube 9 operates at near ground potential. Thus, the normal total voltage drop across the cascode circuit is about 500 volts. It was indicated above that the tube 28 is a high voltage tube; that is, it can withstand relatively large voltages between its anode 24 and its cathode 27. Such a tube is employed to prevent the circuit from burning out in the event of failure of either of the negative voltage supplies. For instance, if the minus 1500 volts supply connected to the lower end of the resistor 38 as illustrated in FIGURE 1 were to fail, the voltage at the anode 34 may rise to as great as 3500 volts. If the tube 28 were to fail under such a voltage, this would cause the section 17 of the tube 9 to fail and would possibly burn out resistors 19 and 12 and also have an adverse effect on the other components of the circuit. Thus, the cascode amplifier arrangement provides basically a constant current device; due to the utilization of a high voltage tube for the tube 28 further serves as a safety device.

The circuit illustrated in FIGURE 1 is adapted to accept only signals having a positive excursion relative to the reference potential which, for purposes of explanation, has been selected as ground potential. The circuit illustrated in FIGURE 2 is basically identical with the circuit illustrated in FIGURE 1 except that provisions have been made to accept alternatively signals which vary either positively or negatively relative to ground. Those elements of FIGURE 2 which are the same as the elements illustrated in FIGURE 1 bear the same reference numerals for purposes of simplicity of explanation.

Referring now specifically to FIGURE 2, only the changes relative to the circuit of FIGURE 1 will be discussed in detail. The circuit is provided with a switch generally designated by the reference numeral 44 having a fixed contact 46, a second fixed contact 47 and a movable contact 48. The contact 46 is connected to the slider 6 and the movable contact 48 is connected to the grid 7 of the section 8 of the tube 9. The contact 47 is connected to a slider 49 adapted to move along a resistor 51 having one end connected to ground and the other end connected to a source of negative potential which, carrying forward the specific example given above, may be approximately minus 70 volts. The contact 46 is further connected via a lead 52 to a stationary contact 53 of a switch 54 having a second stationary contact 56 and a movable contact 57. The movable contacts 48 and 57 of the switches 44 and 54 are ganged for simultaneous movement and they assume relative positions as illustrated in FIGURE 2 in one position of the system. The movable contact 57 of the switch 54 is connected to the grid 21 of the section 17 of the tube 9 and the second stationary contact 56 is connected to a slider 58. The slider 58 is adapted to move along a resistor 59 having one end connected to ground and the other end connected to a suitable source of positive voltage having the same absolute value of voltage to which the resistor 51 is returned. In the specific example given, this is plus 70 volts.

Completing the description of the circuit, the sliders 49 and 58 are ganged so that they move relative to their resistors in unison. The circuit of FIGURE 2 is illustrated with the switches 44 and 54 in a position to accept negative signals. For the moment relating the circuit to the specific circuit illustrated in FIGURE 1; that is, relating it to a circuit adapted to receive a positive signal, the movable contact 48 of the switch 44 is moved to engage the stationary contact 46 and concurrently the movable contact 57 of the switch 54 is moved downwardly to engage the contact 56. With the switches thus positioned, the grid 7 of stage 8 of tube 9 is directly connected to the slider 6 as in FIGURE 1 and the grid 21 of the section 17 of the tube 9 is in direct engagement with the slider 58 and thus is coupled to a selectable positive voltage as is the slider 22 in FIGURE 1. Thus, with the switches positioned as described above, the operation of the circuit of FIGURE 2 is identical with the operation of the circuit of FIGURE 1.

With the switches positioned as illustrated in FIGURE 2, however, the circuit is adapted to receive signal voltages having negative excursions relative to ground. Negative going signals are applied directly to the grid 21 of the section 17 of the tube 9 while the grid 7 of section 8 of the tube 9 is returned to a negative source of potential. The grid 21 becomes more negative upon application of the signal and the current through the cascode output stage comprising tubes 28 and section 17 of the tube 9 is reduced. Reduction of current through tubes 17 and 28 increases the voltage on the lead 39. This circuit therefore has exactly the same effect on the intensity of the display on the face of the tube 42 as when the positive going signal is applied to the input terminal 1 of the circuit of FIGURE 1. The resistor 51, slider 49 and associated power supply are employed to provide an appropriate bias for the grid 7 of the stage 8 of the tube 9 and the entire system functions as a differential amplifier in exactly the same sense as the circuit of FIGURE 1. Thus, the circuit of FIGURE 1 may be readily adapted to accept either positive or negative going signals by the addition of the switches 44 and 54 and resistors 51 and 59 and their associated sliders 49 and 58, respectively. The sliders 49 and 58 constitute the intensity control of the circuit while the slider 6 serves the same function of contrast control as the slider 6 in FIGURE 1. Other than these changes specified above the two circuits are identical and function identically.

As previously indicated, the circuits of the invention may be applied to systems other than the cathode ray tube systems since the cathode ray tube of the circuits described may be replaced with a conventional amplifier operating at large negative potentials. Also, the circuit may be applied to systems where the initial stages of amplification operate at large positive potentials relative to ground and the latter stages operate at lower potentials above, at or below ground.

While I have described and illustrated several embodiments of my invention, it will be clear that variations of the details of construction which are specifically illustrated and described may be resorted to without departing from the true spirit and scope of the invention as defined in the appended claims.

What I claim is:

1. In combination, a circuit for amplifying signals having a quiescent level approximately equal to a reference potential, an output stage for said circuit, said output stage including an amplifying element, a cathode ray tube having at least a cathode, a control grid and an anode, means for connecting said anode to the reference potential, means for connecting said cathode to a first voltage negative with respect to the reference potential by an amount approximately equal to the operating voltage of said cathode ray tube, an impedance connected between said cathode and said control grid of said cathode ray tube, a voltage source connected between said control grid and said amplifying element, said voltage source providing a voltage greater than the difference between the reference potential and said first voltage by an amount approximately equal to the operating voltage of said amplifying element.

2. In combination, a circuit for amplifying signals having a quiescent level approximately equal to a reference potential, said circuit including an output stage having an amplifying element, said amplifying element having a first electrode, a second electrode and a control electrode for controlling flow of charge between said first and second electrode, a cathode ray tube having an anode, a cathode and a control grid, means for connecting said anode to the reference potential, means for connecting said cathode to a first voltage negative with respect to the reference potential by an amount approximately equal to the operating voltage of said cathode ray tube, an impedance connected between said cathode and said control grid of said cathode ray tube, a voltage source connected between said control grid and one of said first and second electrodes of said amplifying element, said voltage source providing a voltage greater than the difference between the reference potential and said first voltage by an amount approximately equal to the requisite first-to-second electrode voltage of said amplifying element.

3. In combination, a circuit for amplifying signals having a quiescent level approximately equal to a reference potential, an output stage for said circuit, said output stage including a cascode amplifier having a common electrode and an output electrode, a cathode ray tube having at least a cathode, a control grid and an anode, means for connecting said anode to the reference potential, means for connecting said cathode to a first voltage negative with respect to the reference potential by an amount approximately equal to the operating voltage of said cathode ray tube, an impedance connected between said cathode and said control grid of said cathode ray tube, a voltage source connected between said control grid and said output electrode of said cascode amplifier, means for maintaining said common electrode of said cascode amplifier at a potential near the reference potential, said voltage source providing a voltage greater than the difference between the reference potential and said first voltage by an amount approximately equal to the operating voltage of said cascode amplifier.

4. The combination according to claim 3 wherein said cascode amplifier comprises first and second electron tubes, one of said electron tubes amplifying an input signal applied thereto and the other of said electron tubes having a constant current characteristic.

5. The combination according to claim 4 further comprising a negative feedback resistor connected in series with said common electrode of said cascode amplifier.

6. The combination according to claim 4 wherein said other of said electron tubes is a high voltage tube capable of withstanding the full voltage of said first voltage, thereacross.

7. The combination according to claim 3 wherein said circuit for amplifying comprises a differential amplifier and wherein said cascode amplifier comprises one stage of said differential amplifier.

8. In combination, a circuit for amplifying signals having a quiescent level approximately equal to a reference potential, an output stage for said circuit, said output stage including an amplifying element, a voltage source having a positive voltage terminal and a negative voltage terminal, means connecting said positive voltage terminal to said amplifying element to provide an operating voltage therefor, a utilization circuit for said signals, an impedance, said utilization circuit having an input circuit connected across said impedance, means connecting said impedance between said negative voltage terminal of said voltage source and a source of potential which is highly negative relative to the reference potential.

9. In combination, a circuit for amplifying signals having a quiescent level approximately equal to a reference potential, said circuit including a differential amplifier having a first and a second electron tube, said first and second electron tubes each having a control grid and an anode, a cathode ray tube having a control grid and a cathode, an impedance connected between said cathode and said control grid of said cathode ray tube, a voltage source connected between said control grid of said cathode ray tube and the anode of said second electron tube, means connecting said cathode of said cathode ray tube to a voltage which is highly negative relative to the reference potential, said voltage source providing a voltage thereacross greater than the difference between the highly negative voltage and the reference voltage by an amount equal to operating potential of said second electron tube, and means for selectively applying said input signal to control grid of said first and said second electron tube depending upon the polarity of the excursions of said signal relative to the reference potential.

10. In combination, a circuit for amplifying signals having a quiescent level approximately equal to a reference potential, an output stage for said circuit, said output stage including an amplifying element, a cathode ray tube having at least a cathode, a control grid and an anode, means for connecting said anode to the reference potential, means for developing a voltage on said cathode which is negative with respect to the reference potential by an amount approximately equal to the operating potential of said cathode ray tube, an impedance connected between said cathode and said control grid of said cathode ray tube, a voltage source connected between said control grid and said amplifying element, said voltage source providing a voltage greater than the difference between the reference potential and the negative voltage on said cathode by an amount approximately equal to the operating voltage of said amplifying element.

References Cited in the file of this patent

UNITED STATES PATENTS 2,884,492 Swain ------------------ Apr. 28, 1959